US012506706B2

(12) United States Patent
Daffern et al.

(10) Patent No.: US 12,506,706 B2
(45) Date of Patent: Dec. 23, 2025

(54) BROWSER PLATFORM FOR SELF-HOSTING A WEB SERVICE

(71) Applicant: International Business Machines Corporation, Armonk, NY (US)

(72) Inventors: Nicholas James Daffern, Winchester (GB); William James Simmons, Winchester (GB); James Adam Nash, London (GB); Giles Auryn Hasler Billenness, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 18/221,113

(22) Filed: Jul. 12, 2023

(65) Prior Publication Data

US 2025/0023843 A1    Jan. 16, 2025

(51) Int. Cl.
*H04L 61/45* (2022.01)
*H04L 67/75* (2022.01)

(52) U.S. Cl.
CPC .......... *H04L 61/457* (2022.05); *H04L 67/75* (2022.05)

(58) Field of Classification Search
None
See application file for complete search history.

(56) References Cited

U.S. PATENT DOCUMENTS

| | | | |
|---|---|---|---|
| 10,193,853 B1 * | 1/2019 | Phipps | H04L 67/52 |
| 10,320,740 B2 * | 6/2019 | Saiyed | H04L 61/4511 |
| 10,521,447 B2 | 12/2019 | Cahana et al. | |
| 11,635,995 B2 * | 4/2023 | Bahl | G06F 9/3877 |
| | | | 718/104 |
| 11,659,058 B2 * | 5/2023 | Liguori | H04L 12/4633 |
| | | | 709/219 |
| 11,665,205 B2 * | 5/2023 | Arkin | G06F 13/4265 |
| | | | 709/219 |
| 11,699,093 B2 * | 7/2023 | Nookula | G06N 5/022 |
| | | | 706/12 |
| 11,743,153 B2 * | 8/2023 | Sivaraman | H04L 67/30 |
| | | | 709/223 |
| 11,743,953 B2 * | 8/2023 | Tamvada | H04W 76/12 |
| | | | 370/329 |

(Continued)

FOREIGN PATENT DOCUMENTS

| | | |
|---|---|---|
| CN | 113127137 A | 7/2021 |
| WO | 2015171030 A1 | 11/2015 |
| WO | 2020092013 A1 | 5/2020 |

OTHER PUBLICATIONS

Anonymous, Boinc and Docker, https://boinc.berkeley.edu/trac/wiki/BoincDocker, last accessed May 203.

(Continued)

*Primary Examiner* — Melvin H Pollack
(74) *Attorney, Agent, or Firm* — CHIP LAW GROUP

(57) ABSTRACT

An example operation may include one or more of downloading a container image of a web service from a data store, wherein the web service is configured to be self-hosted, deploying a self-hosted copy of the web service within a container runtime of a local device based on execution of the downloaded container image, and modifying a domain name system (DNS) to include a mapping of the web service to a local network address of the self-hosted copy of the web service deployed in the container runtime.

18 Claims, 7 Drawing Sheets

(56) References Cited

U.S. PATENT DOCUMENTS

| | | | |
|---|---|---|---|
| 11,765,038 B2* | 9/2023 | Stern | G16Y 10/75 709/224 |
| 11,797,289 B2* | 10/2023 | Zemla | G06F 9/44521 |
| 11,871,240 B2* | 1/2024 | Gupta | H04W 16/02 |
| 11,934,885 B2* | 3/2024 | Guchhait | G06F 9/5083 |
| 11,968,201 B2* | 4/2024 | Ahmed | H04L 63/164 |
| 12,056,515 B1* | 8/2024 | Mills | G06F 21/53 |
| 12,106,253 B2* | 10/2024 | Ding | G06F 9/455 |
| 12,112,155 B2* | 10/2024 | Monteiro Vieira | G06F 16/90344 |
| 12,125,061 B2* | 10/2024 | Sethuraman | G06Q 30/0255 |
| 12,153,501 B2* | 11/2024 | Madhuvanthi Janarthanam | H04L 67/568 |
| 12,169,736 B2* | 12/2024 | Poddar | G06F 21/53 |
| 12,177,683 B2* | 12/2024 | Gadalin | H04W 16/22 |
| 12,255,972 B2* | 3/2025 | Merwaday | H04W 8/082 |
| 2022/0224726 A1 | 7/2022 | Pulapaka et al. | |
| 2023/0006988 A1* | 1/2023 | Menth | H04L 63/20 |
| 2023/0015916 A1* | 1/2023 | Ryu | H04L 67/148 |
| 2023/0094159 A1* | 3/2023 | Difranco | G06F 9/5072 718/1 |
| 2023/0179974 A1* | 6/2023 | Gadalin | H04W 40/34 455/418 |
| 2023/0195535 A1* | 6/2023 | Pabón | G06F 9/455 718/104 |
| 2023/0337113 A1* | 10/2023 | Trujillo | H04W 40/28 |
| 2023/0367833 A1* | 11/2023 | Kol | H04L 63/0876 |
| 2024/0146626 A1* | 5/2024 | Georgiev | H04L 43/045 |
| 2024/0231876 A1* | 7/2024 | Sharma | G06F 9/45558 |
| 2024/0333594 A1* | 10/2024 | Bahm | H04L 41/0866 |
| 2024/0406825 A1* | 12/2024 | Mueller | H04W 36/1446 |
| 2025/0001312 A1* | 1/2025 | Zhang | H04L 67/141 |

OTHER PUBLICATIONS

Anonymous, website: github.com, Self Hosted Kanban Board, last accessed May 2023.

Anonymous, Website: kubernetes.io, Kubernetes, last access May 2023.

Anonymous, Website: languagetool.org, Grammar Correction Tool with Plugin to Integrate with Self Hosting, last accessed May 2023.

* cited by examiner

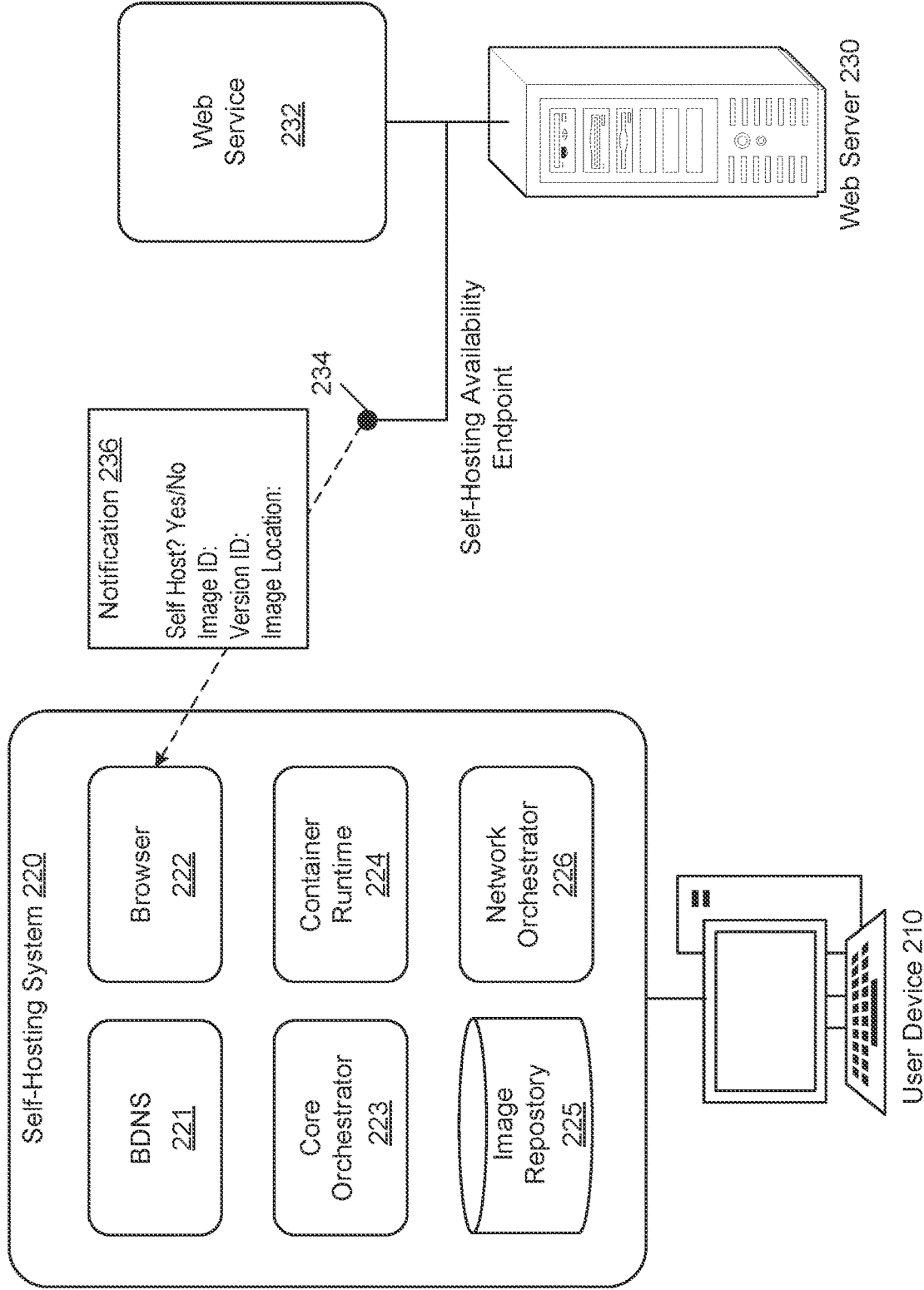

BROWSER PLATFORM FOR SELF-HOSTING A WEB SERVICE

BACKGROUND

Websites that provide a user with a rich interactive experience typically require a significant amount of hardware. Furthermore, when the website has high traffic, the amount of computation power required by the hardware to provide the experience increases. In some cases, a network provider may throttle a network bandwidth dedicated to the website if it cannot keep up with the demand, thereby downgrading the experience of the users that are using the website. Also, when a user uses a web service, in conjunction with a domain name system, their browser is required to send information to the provider of that web service. For example, many browsers include a grammar-checking tool built into the browser. This function sends all of the text that is typed by user while using their browser to the service provider. This can be a security risk because the data can be mishandled by the provider, and sensitive user data could be exposed.

SUMMARY

One example embodiment provides an apparatus that may include a processor that may download a container image of a web service from a data store, wherein the web service is configured to be self-hosted, deploy a self-hosted copy of the web service within a container runtime of a local device based on execution of the downloaded container image, and modify a domain name system (DNS) to include a mapping of the web service to a local network address of the self-hosted copy of the web service deployed in the container runtime.

Another example embodiment provides a method that may include one or more of downloading a container image of a web service from a data store, wherein the web service is configured to be self-hosted, deploying a self-hosted copy of the web service within a container runtime of a local device based on execution of the downloaded container image, and modifying a domain name system (DNS) to include a mapping of the web service to a local network address of the self-hosted copy of the web service deployed in the container runtime.

A further example embodiment provides a computer program product comprising a computer readable storage medium having stored thereon instructions, that when executed by a processor, cause the processor to perform one or more of downloading a container image of a web service from a data store, wherein the web service is configured to be self-hosted, deploying a self-hosted copy of the web service within a container runtime of a local device based on execution of the downloaded container image, and modifying a domain name system (DNS) to include a mapping of the web service to a local network address of the self-hosted copy of the web service deployed in the container runtime.

BRIEF DESCRIPTION OF THE DRAWINGS

FIG. 2A is a diagram illustrating a process of querying a web service to determine if the web service is capable of being self-hosted according to example embodiments.

DETAILED DESCRIPTION

Figure 1:
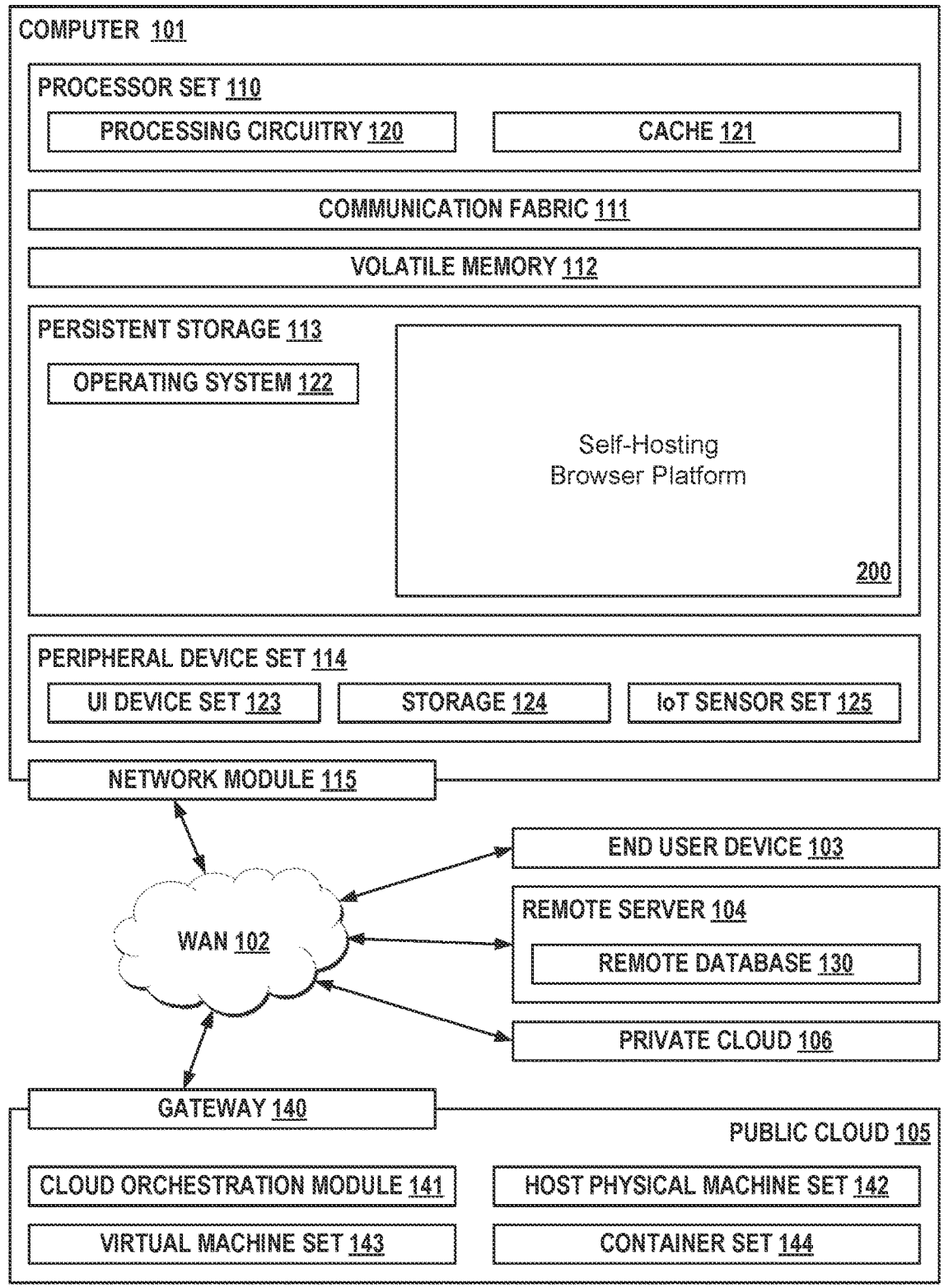
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a software application referred to herein as a browser platform that can configure a local device to self-host a remotely hosted web service such as a website. The browser platform includes a browser such as a web browser, mobile browser, and the like, which can be used to search the World Wide Web for pages of content. For example, the browser may enable the search of websites via a search engine that is built into the browser. The browser platform may also include a domain name system (DNS) that can be used to control the routing of web requests to a self-hosted web service. In the example embodiments, the DNS may be referred to as a "browser" DNS or BDNS. For example, the BDNS can be used to route web requests from the browser to the self-hosted web service instead of the remotely hosted web service.

The browser platform may also include an orchestrator which controls the overall operations and steps of the browser platform and a network orchestrator that enables the web service to be self-hosted on multiple local devices instead of a single local device, thereby scaling up or down the service level of the self-hosted web service. In some cases, the browser platform may be downloaded from a cloud platform or other remote service such as a web server, etc. Here, the cloud platform may provide a repository of container images that can be fetched by user devices and used to self-host web services locally on the user devices.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for executing at least some of the computer code involved in performing the inventive methods, such as self-hosting browser platform 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric comprises switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is an external storage or data store, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

The example embodiments are directed to a platform (which can comprise a software application) for self-hosting a web service such as a website. Here, a user may install the platform on their device and choose to run a program on their local system to replicate the functionality of a web service and interact with it through a browser or application of the platform. For example, the browser can be used to query the local machine (local host) where the local copy of the web service is being hosted instead of an external server. This configuration provides web-like functionality even when an internet connection is unstable or unavailable. Furthermore, the self-hosted web services can be used as a backend for browser plugins if manually configured by a user, or simply as a locally hosted version of a service.

The example embodiments may be implemented via an easy-to-use software application such as a desktop or mobile application consisting of a web browser with browsing capabilities and does not require a cloned repository executing a binary of various types to self-host a web service. The instant software application includes a container runtime environment capable of reacting to browser content, user interaction with the browser, and communication with web services. The application also includes an image repository capable of syncing with remote repositories based on browser content, user interaction with the browser, and communication with web services, as well as a configurable domain name service (DNS).

When self-hosting is requested, the host platform may download one or more container image of the web service to be self-hosted to a local user machine (for example, a user device) and run as a container within the integrated container runtime. In some embodiments, the downloading process may include downloading a plurality of container images for a plurality of different components of the overall web service. The integrated BDNS may be dynamically configured to resolve the domain name of the now locally hosted web-service to the container that has been created and which is running within the integrated container runtime. The browser may include a user interface, banner, wallpaper, etc., which may display a visual indication to the user that the page is being hosted locally. For example, data such as an icon, a light, a shading, or the like, may be displayed on the screen to inform the user that the page they are visiting is being hosted locally on their machine. The user can then browse and access a website in a typical manner. Depending on the settings of the browser, upon closing the page, the container may be deleted, paused, or remain in a live state.

The browser platform can also apply the same logic to plugins. If a browser plugin is installed and has the option to self-host, then the browser platform can download an image of a container and deploy the container with the integrated container runtime to provide the backend of the plugin. Furthermore, the communication to the plugin can then be routed to the local container via the integrated DNS service.

In some examples, a container provided from the website may be used by default when self-hosting the application. However, the user also has the ability to override the image used for a given domain with their own image. This allows the user to build their own version of the web application or plugin, or to use a community version that may be more secure. It also allows users to provide community support for websites which do not directly support or provide an image to be run.

The container created by the browser can be exposed beyond the user's local system and could be used on a wireless local area network (WLAN) or wider network. If enabled, the browser will start a WLAN or web facing server which can be discovered and queried on a network. A browser running on a separate machine or device acts as a client and can discover and query other browser instances. After successful authentication, the client browser is provided details on how to configure its internal BDNS to point at the hosting machine. An example application related to this configuration could be a self-hosted planning tool or visual workflow that can be used by a small business or a calendar to be used by members of a household.

The browser platform described herein is different than known self-hosting mechanisms because it automates the process of self-hosting applications and does not require extensive dependencies to be installed on the host machine. In the case of mobile devices, the compilation and execution of self-hosted services is currently difficult. In contrast, the instant browser platform provides a seamless method of using locally hosted services which does not take away from the browsing experience or require further configuration. Furthermore, the browser platform enables unskilled users to gain improved security, data protection and resilience to internet outages by simplifying the self-hosting process. The browser platform provides a framework for websites to host their own applications in an inexpensive and efficient manner. The browser platform is unique in its combination of a container runtime, a browser, an image repository, and BDNS to provide an orchestration service to allow seamless self-hosting.

Figure 2B:
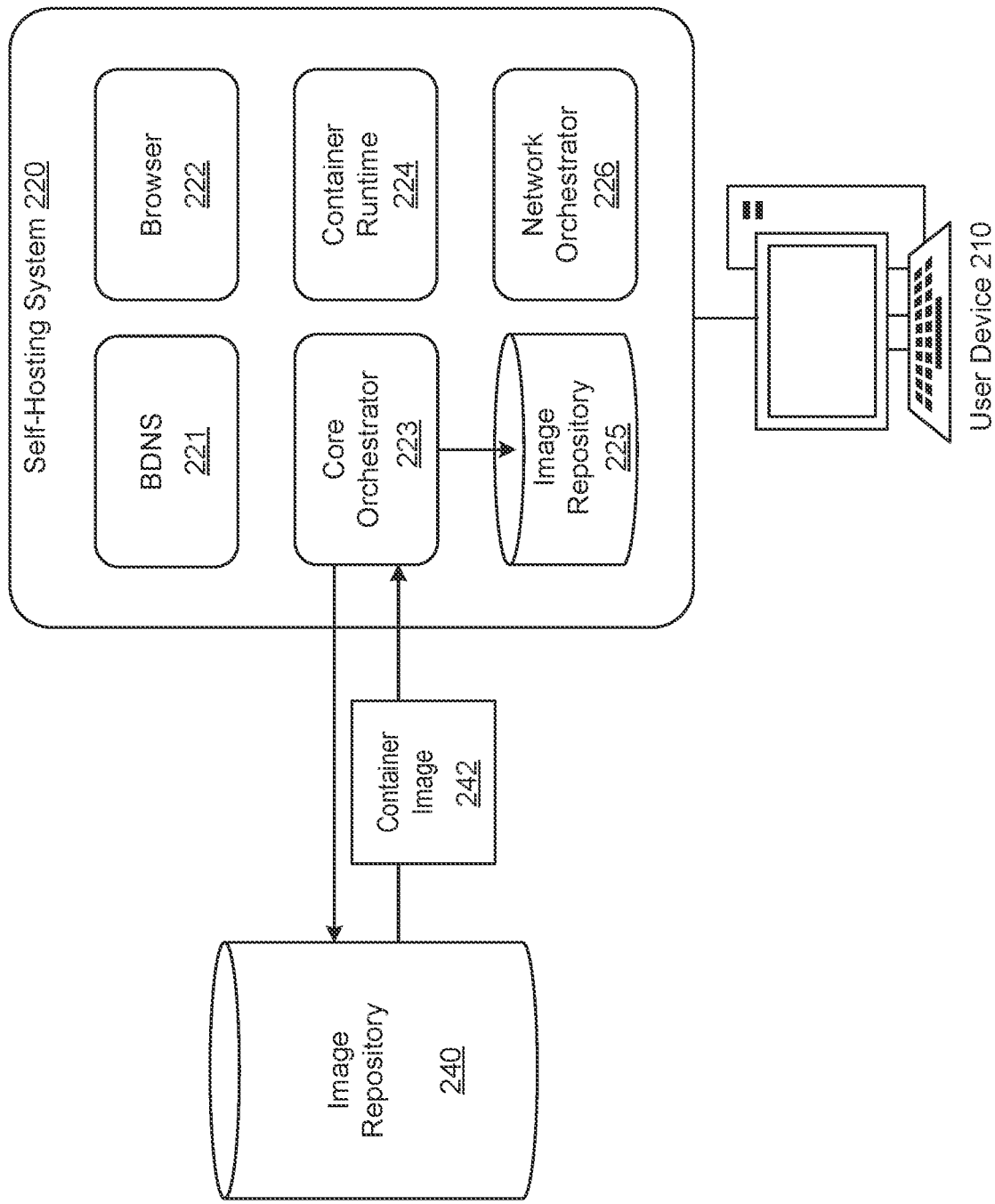
FIG. 2B is a diagram illustrating a process of downloading a container image from an external data source according to example embodiments.
Figure 2C:
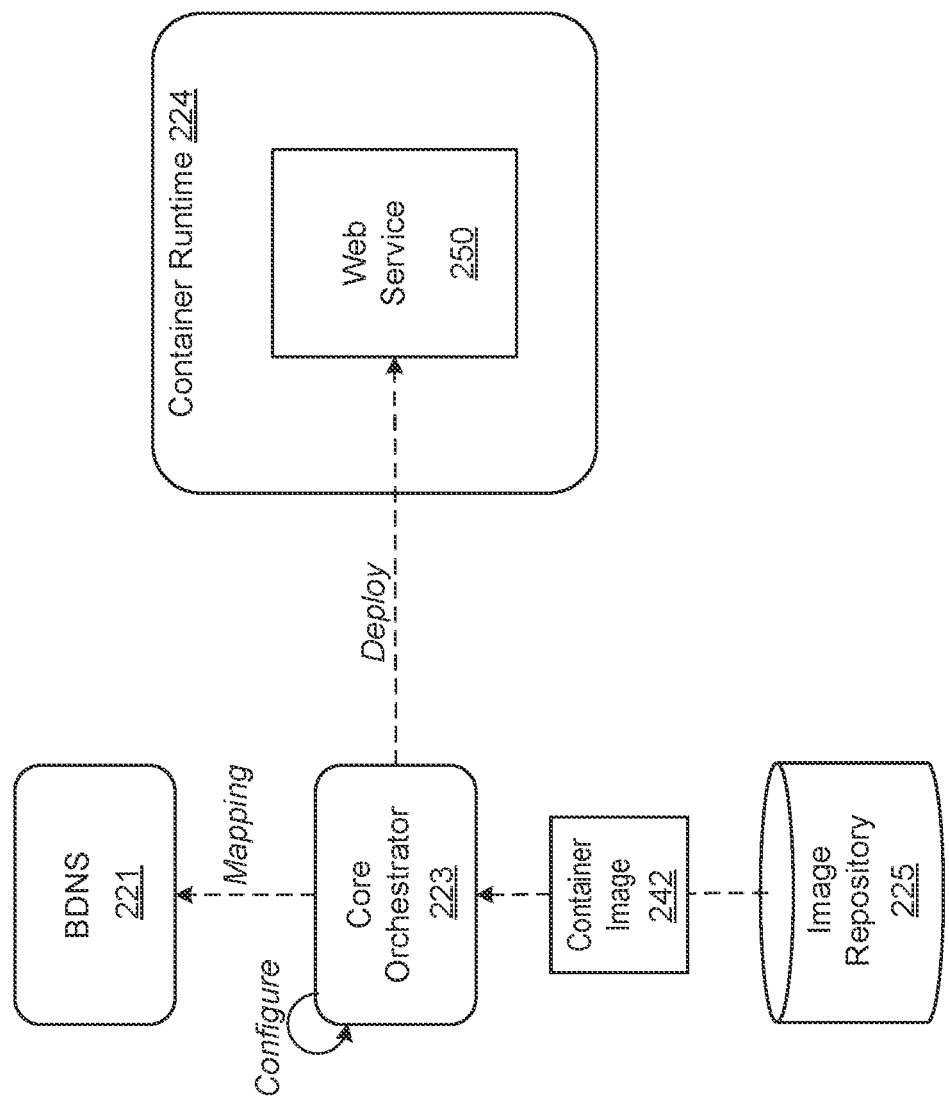
FIG. 2C is a diagram illustrating a process of deploying a self-hosted copy of the web service according to example embodiments.
Figure 2D:
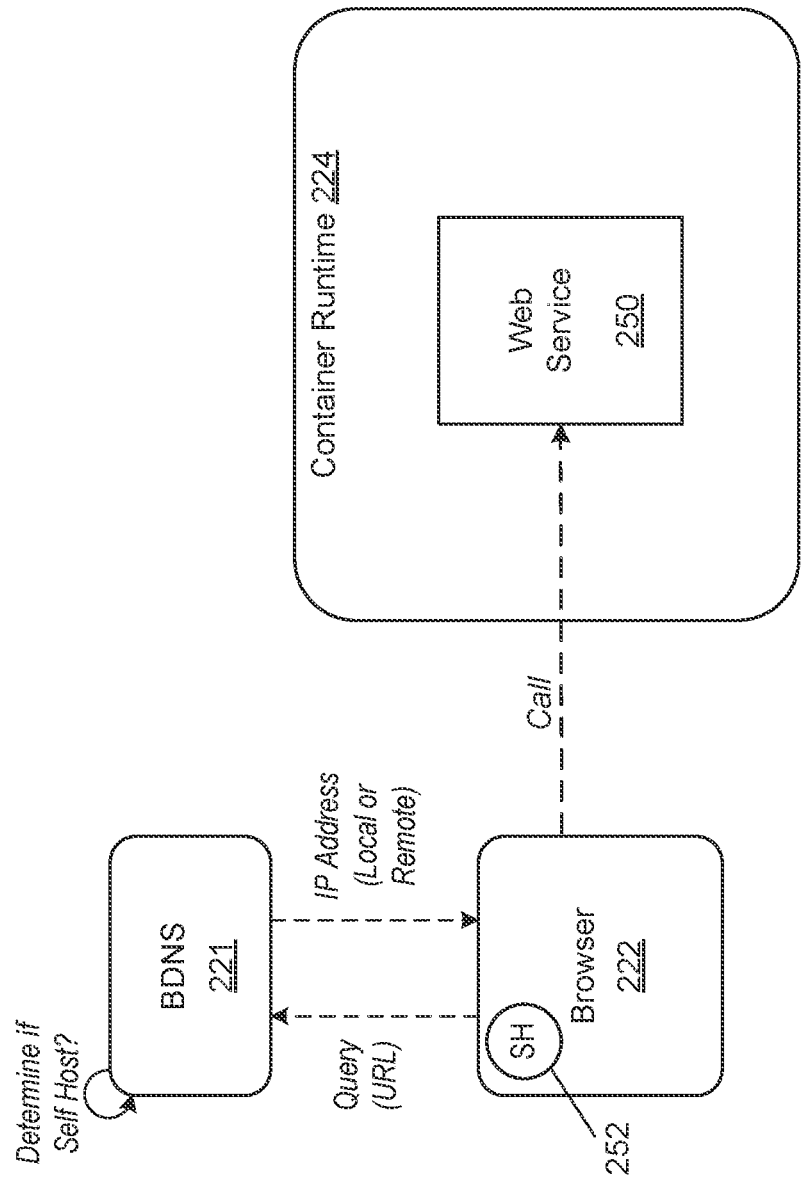
FIG. 2D is a diagram illustrating a process of routing traffic to the self-hosted copy of the web service according to example embodiments.

FIG. 2A illustrates a process 201 of querying a web service to determine if the web service is capable of being self-hosted according to example embodiments, FIG. 2B illustrates a process 202 of downloading a container image from an external data source according to example embodiments, FIG. 2C illustrates a process 203 of deploying a self-hosted copy of the web service according to example embodiments, and FIG. 2D illustrates a process 204 of routing traffic to the self-hosted copy of the web service according to example embodiments.

Referring to FIGS. 2A-2D, a self-hosting system 220 may perform the examples described herein, including setting up and self-hosting a web service that is typically hosted by a remote web server 230. The self-hosting system 220 may be a software application, in some embodiments. In these examples, the self-hosting system 220 includes a domain name system (DNS) 221, a browser 222, a core orchestrator 223, a container runtime 224, an image repository 225, and a network orchestrator 226. The self-hosting system 220 may be installed on a user device 210, such as a personal computer, a smartphone, a tablet, a smart wearable, a laptop computer, and the like.

For example, the browser 222 may be a web browser or mobile browser with a standard browsing interface. According to various embodiments, the browser 222 is capable of communicating directly with the BDNS 221, the image repository 225, the core orchestrator 223, and the network orchestrator 226. When a user visits a website, a GET request may be made to a web service 232 (such as a website) on a predefined endpoint 234 such as a predefined uniform resource locator (URL), network address, etc., associated with the web service 232. The endpoint 234 may respond with a notification 236 that includes a Boolean value (i.e., yes or no) which indicates whether or not the website can be self-hosted, an identifier of a container image of the web service 232, a network address or other location where the container image can be downloaded, and a version identifier of the web service 232.

If there is no valid data returned from the endpoint 234, the core orchestrator 223 may assume/understand that the web service 232 has no self-hosting functionality. In some embodiments, the browser 222 may query the core orchestrator 223 to determine if there are sufficient resources to create a container from the supplied image. If there are adequate resources, the browser 222 may check user preferences to determine if it should host the application. If these checks are validated, the browser 222 may pass the specification from the image to the core orchestrator 223 to deploy a self-hosted copy of the service. If these checks are not validated, a separate specification can be passed to the core orchestrator 223, which may be forwarded further to the network orchestrator 226. If the browser 222 receives communication from the core orchestrator 223 that the container for a self-hosted application is now running, the browser 222 may display data such as a symbol, a logo, a button, a color, shading, etc., within a user interface of the browser 222 to indicate that the web service 232 is being self-hosted. Thus, when a user navigates to the page(s) of the web service 232, they will see an indicator that indicates the web service 232 is currently being self-hosted locally. Other status symbols can be displayed by the browser 222 on the user interface, for example, if there is an error passed by the core orchestrator 223. If the user leaves the website, changes a tab, or initiates a browser shutdown, the browser 222 may consult the user settings and STOP or PAUSE the self-hosting process.

The core orchestrator 223 may include or otherwise be coupled to a container runtime 224, such as CRIO, and control software for that runtime. Upon receiving a specification for the web service 232, which is to be self-hosted, the core orchestrator 223 may extract the image field from the endpoint 234 and pull a container image 242 from an external image repository 240 such as shown in the example of FIG. 2B. Failing to pull the image results in an error being passed to the browser 222. If an image does exist but is not built for the architecture of the machine running the browser, the core orchestrator 223 may communicate with the network orchestrator 226 to find a suitable machine. When the container image 242 is successfully pulled, the core orchestrator 223 may store the container image 242 in the image repository 225 that is local to the self-hosting system 220.

Furthermore, as shown in FIGS. 2C and 2D, the core orchestrator 223 may launch/deploy a self-hosted copy of the web service 250 (corresponding to web service 232) locally within the container runtime 224 on the self-hosting system 220 on the user device 210. That is, the self-hosted copy of the web service 250 is the same as the web service 232, except that the backend is hosted locally on the user device 210 instead of on the remote server 230. For example, the core orchestrator 223 may execute one or more container images, such as the container image 242, to deploy an instance/copy of the self-hosted web service 250.

Once the self-hosted web service 250 is running, the core orchestrator 223 may notify the browser 222 that the self-hosted web service 250 is running, which will cause the browser 222 to display an indicator, such as a light or shadow 252 shown in FIG. 2D. In the event of a container failure, the core orchestrator 223 may restart the container, or recreate the container. A container run by the core orchestrator 223 may have its network settings configured, for example, to block all communication with the internet if the application is fully self-hosted and needs no access to backend systems, or for hybrid applications to retrieve certain information from predefined endpoints or hosts.

The self-hosted system 220 may include an integrated Browser Domain Name System (BDNS) 221 by default that has no unique configuration. When a request is made by the browser 222 to visit a specific URL, the browser 222 may query the BDNS 221 to see if a mapping exists for the given name. If no mapping exists, then the BDNS 221 may follow the standard pattern for resolving a hostname by calling a recursive BDNS resolver, either that of an ISP or other provider. When the web service is self-hosted, and a container has been started and validated as running by the core orchestrator 223, then the core orchestrator 223 may add an entry to the BDNS 221 containing a mapping between an identifier of the web service 232 (e.g., a URL, etc.) mapped to a local network address of the self-hosted copy of the web service 250 on the user device 210, a defined port for the self-hosted copy of the web service 250 on the user device 210, and/or the like. Any subsequent calls from the browser 222 are resolved by the BDNS 221. In this case, the BDNS 221 will receive a URL in a call from the browser 222 and determine whether a corresponding web service/page that corresponds to the URL is being hosted locally or remotely. If hosted locally, the BDNS 221 will respond with a local IP address. Otherwise, it will respond with a remote IP address of the remote host. If resolving to another host on a local network or on a wider network, then once a connection has been authenticated and established, the network orchestrator 226 may add an entry to the BDNS 221, including the IP and port of the externally hosted container.

In the example of FIG. 2D, the browser 222 may query the BDNS 221 with an identifier of a website/web page, such as a URL of the site/page, or the like. The BDNS 221 may monitor and track which web services are currently being self-hosted by the local device. Here, the BDNS 221 may determine whether the web service being requested is being locally hosted or is being remotely hosted. If it is being locally hosted, the BDNS 221 can respond with an IP address of a local endpoint of the web service on the local device (e.g., within the container runtime 224, etc.). However, if the web service is still being hosted by its remote host, the BDNS 221 may respond to the browser 222 with a remote IP address of the remote host server.

The network orchestrator 226 may offer the ability to locally host a web service across a group of devices within a local network in a shared-hosting manner. In this example, the network orchestrator 226 may act as both a server and a client for other systems on the network. Each machine on the network with a self-hosting system 220 will be able to respond to GET requests for a list of running self-hosted applications. Each machine will have settings to determine which and how many other machines can connect. When another machine makes a request to join the self-hosted instance, and it is approved, the BDNS 221 information required for that service is sent to the requesting machine. Authentication via Token, certificates (such as SSL/TLS), or other methods may be used in the connection request.

On the connecting machine, the BDNS 221 is configured using the information, and the browser 222 is notified so that its user interface can be updated. Requests for connections can also be accepted or declined by, for example, popups which appear in the web-browser. If the architecture of a machine is not suitable to host a web service, then the network orchestrator 226 can contact other machines on the network to request that they host the application. This can also be done if more capacity for the application is needed, or one machine no longer has enough hardware resources to host an application. Upon receiving a request to host an application, if accepted, the network orchestrator 226 receives the URL of the original website and requests that the browser perform the queries to obtain the data regarding hosting that application. The network orchestrator 226 is capable of establishing load balancing between multiple local instances of self-hosted applications.

Figure 3A:
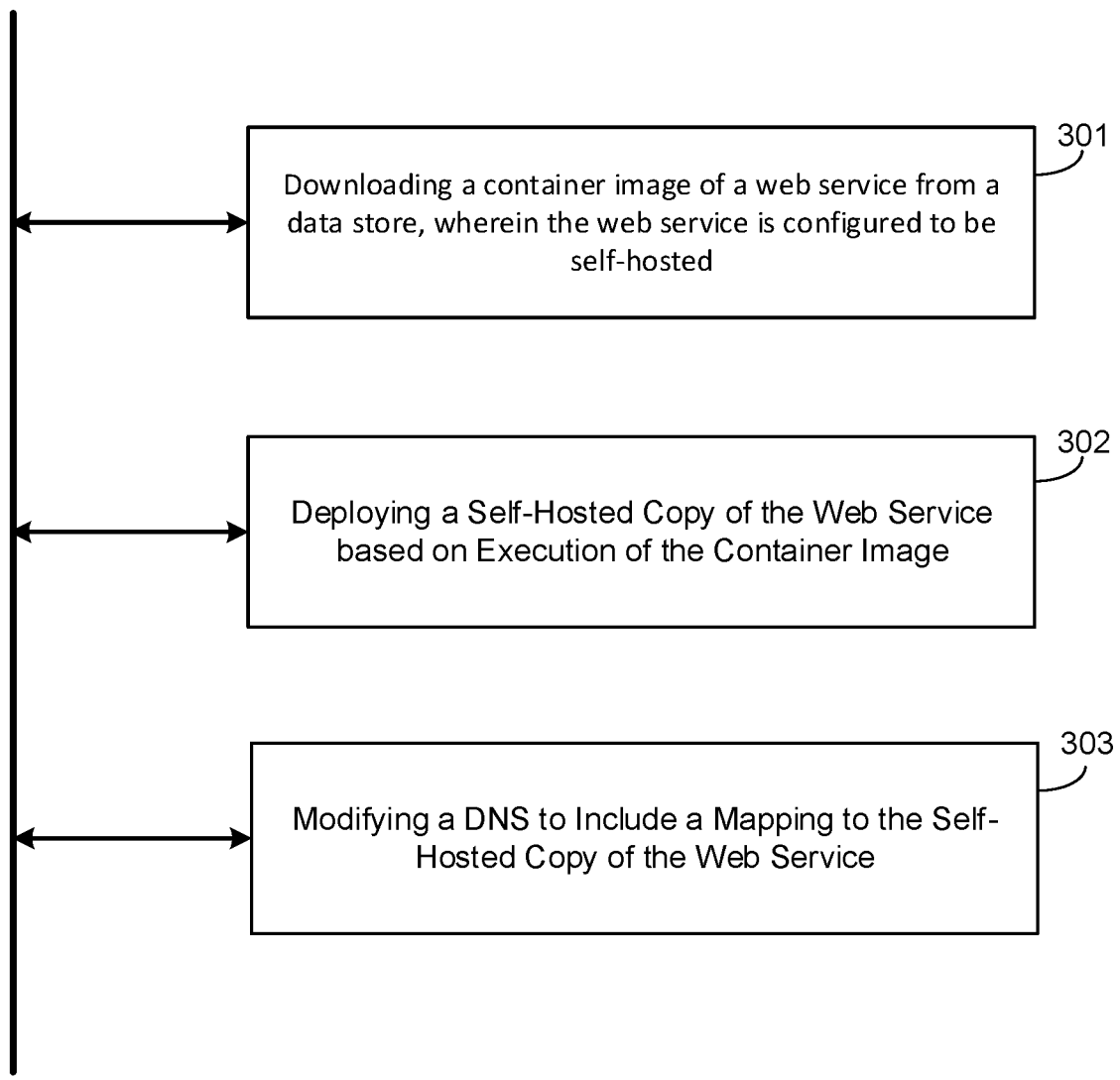
FIG. 3A is a diagram illustrating a method of self-hosting a web service according to example embodiments.
Figure 3B:
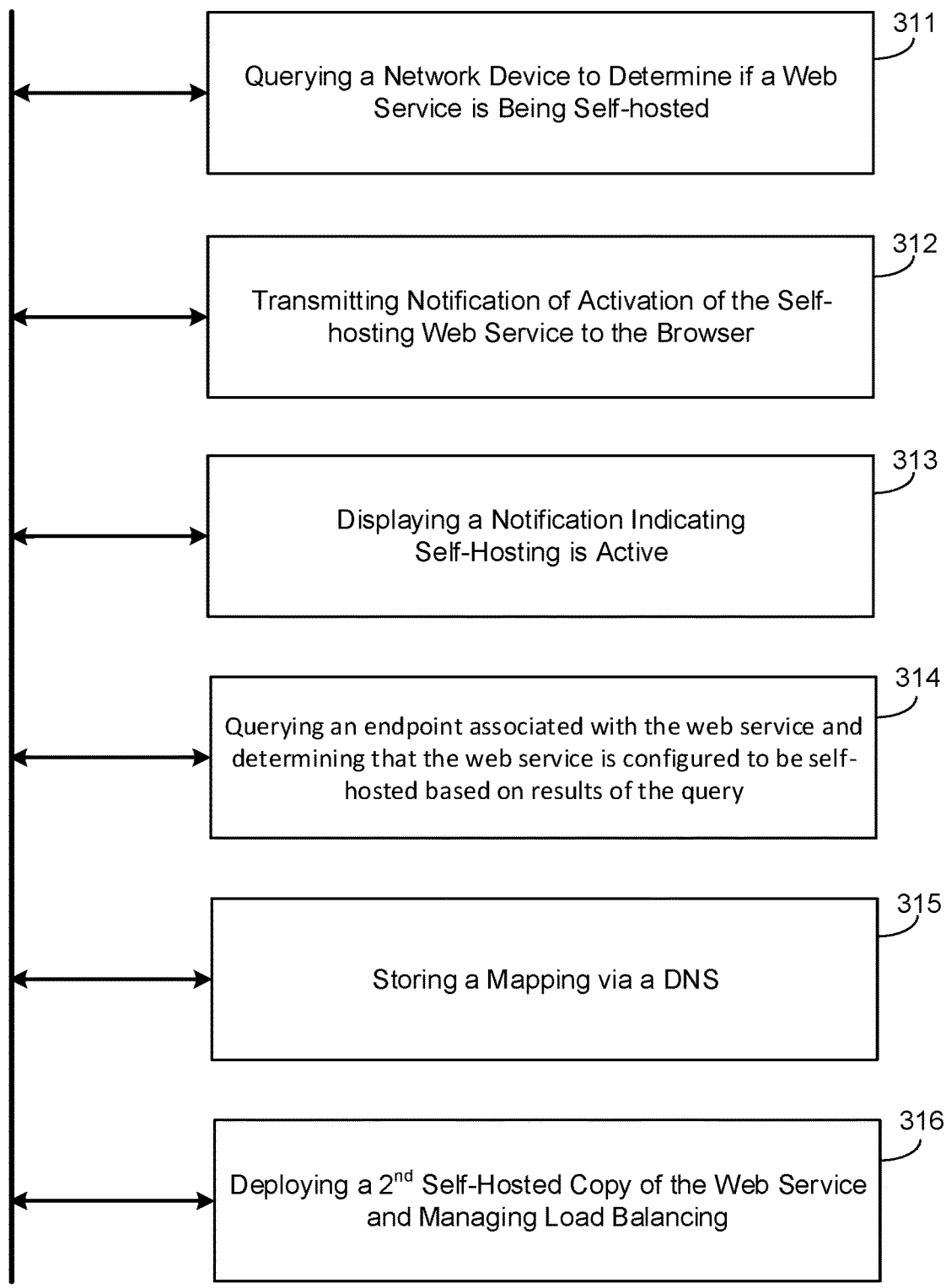
FIG. 3B is a diagram illustrating a method of self-hosting a web service according to other example embodiments.

FIG. 3A illustrates a method 300 of self-hosting a web service according to example embodiments, and FIG. 3B illustrates a method 310 of self-hosting a web service according to other example embodiments. Referring to FIG. 3A, in 301, the method may include downloading a container image of a web service from a data store, wherein the web service is configured to be self-hosted. In 302, the method may include deploying a self-hosted copy of the web service within a container runtime of a local device based on execution of the downloaded container image. In 303, the method may include modifying a domain name system (DNS) to include a mapping of the web service to a local network address of the self-hosted copy of the web service deployed in the container runtime.

Referring now to FIG. 3B, in 311, the method may include querying an endpoint associated with the web service to identify an external storage location of the container image of the web service. In some embodiments, the method may also include querying a networked device to determine if it is running a container image. In 312, the local device may include a browser, and the method may further include transmitting a notification of execution or activation of the self-hosted copy of the web service via the container runtime to the browser. In 313, the method may further include displaying a notification within the browser which indicates the web service is self-hosted. In 314, the method may further include querying an endpoint associated with the web service and determining that the web service is configured to be self-hosted based on results of the query.

In 315, the modifying may include storing an identifier of the web service mapped to a defined port of the local device where the self-hosted copy of the web service is hosted via the DNS. In 316, the method may further include deploying a second self-hosted copy of the web service on a second system, enabling both the self-hosted copy and the second self-hosted copy of the web service to receive traffic, and performing load balancing between the self-hosted copy of the web service and the second self-hosted copy of the web service via a network orchestrator.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external, to the modules or components. Also, the information sent between various modules can be sent between the modules via at least one of: a data network, the Internet, a voice network, an Internet Protocol network, a wireless device, a wired device, and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom, very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
a processor configured to:
query an endpoint associated with a web service;
determine, based on results of the query, that the web service is configured to be self-hosted;
download, based on the determination that the web service is configured to be self-hosted, a container image of the web service from a data store;

deploy a self-hosted copy of the web service within a container runtime of a local device based on execution of the downloaded container image; and modify a domain name system (DNS) to include a mapping of the web service to a local network address of the self-hosted copy of the web service deployed in the container runtime.

2. The apparatus of claim 1, wherein the processor is further configured to identify, based on the results of the query, a data store location of the container image of the web service.

3. The apparatus of claim 1, wherein the apparatus further comprises a browser, and the processor is further configured to transmit a notification of execution of the self-hosted copy of the web service via the container runtime to the browser.

4. The apparatus of claim 3, wherein the processor is further configured to display a notification within the browser which indicates the web service is being self-hosted.

5. The apparatus of claim 1, wherein the processor is further configured to store an identifier of the web service mapped to a defined port of the local device where the self-hosted copy of the web service is hosted, via the DNS.

6. The apparatus of claim 1, wherein the processor is further configured to deploy a second self-hosted copy of the web service on a second system, and enable both the self-hosted copy and the second self-hosted copy of the web service to receive traffic.

7. A method, comprising:
querying an endpoint associated with a web service;
determining, based on results of the querying, that the web service is configured to be self-hosted;
downloading, based on the determining that the web service is configured to be self-hosted, a container image of the web service from a data store;
deploying a self-hosted copy of the web service within a container runtime of a local device based on execution of the downloaded container image; and
modifying a domain name system (DNS) to include a mapping of the web service to a local network address of the self-hosted copy of the web service deployed in the container runtime.

8. The method of claim 7, wherein the method further comprises identifying, based on the results of the querying, a data store location of the container image of the web service.

9. The method of claim 7, wherein the local device comprises a browser, and the method further comprises transmitting a notification of execution of the self-hosted copy of the web service via the container runtime to the browser.

10. The method of claim 9, wherein the method further comprises displaying a notification within the browser which indicates the web service is self-hosted.

11. The method of claim 7, wherein the modifying comprises storing an identifier of the web service mapped to a defined port of the local device where the self-hosted copy of the web service is hosted, via the DNS.

12. The method of claim 7, wherein the method further comprises deploying a second self-hosted copy of the web service on a second system, and enabling both the self-hosted copy and the second self-hosted copy of the web service to receive traffic.

13. A computer program product comprising a computer readable storage medium having stored thereon instructions, that when executed by a processor, cause the processor to perform:
querying an endpoint associated with a web service;
determining, based on results of the querying, that the web service is configured to be self-hosted;
downloading, based on the determining that the web service is configured to be self-hosted, a container image of the web service from a data store;
deploying a self-hosted copy of the web service within a container runtime of a local device based on execution of the downloaded container image; and
modifying a domain name system (DNS) to include a mapping of the web service to a local network address of the self-hosted copy of the web service deployed in the container runtime.

14. The computer program product of claim 13, wherein the instructions further cause the processor to perform:
identifying, based on the results of the querying, a data store location of the container image of the web service.

15. The computer program product of claim 13, wherein the local device comprises a browser, and the instructions further cause the processor to perform:
transmitting a notification of execution of the self-hosted copy of the web service via the container runtime to the browser.

16. The computer program product of claim 15, wherein the instructions further cause the processor to perform:
displaying a notification within the browser which indicates the web service is being self-hosted.

17. The computer program product of claim 13, wherein the instructions further cause the processor to perform:
deploying a second self-hosted copy of the web service on a second system, and enabling both the self-hosted copy and the second self-hosted copy of the web service to receive traffic.

18. The apparatus of claim 1, wherein the results of the query associated with the web service comprises at least one of a value that indicates whether the web service is configured to be self-hosted, an identifier of the container image of the web service, a network address where the container image is downloadable, or a version identifier of the web service.

* * * * *